Feb. 15, 1966  C. M. STERN  3,235,713
AUTOMATED PRICE COMPUTATION
Filed April 2, 1959
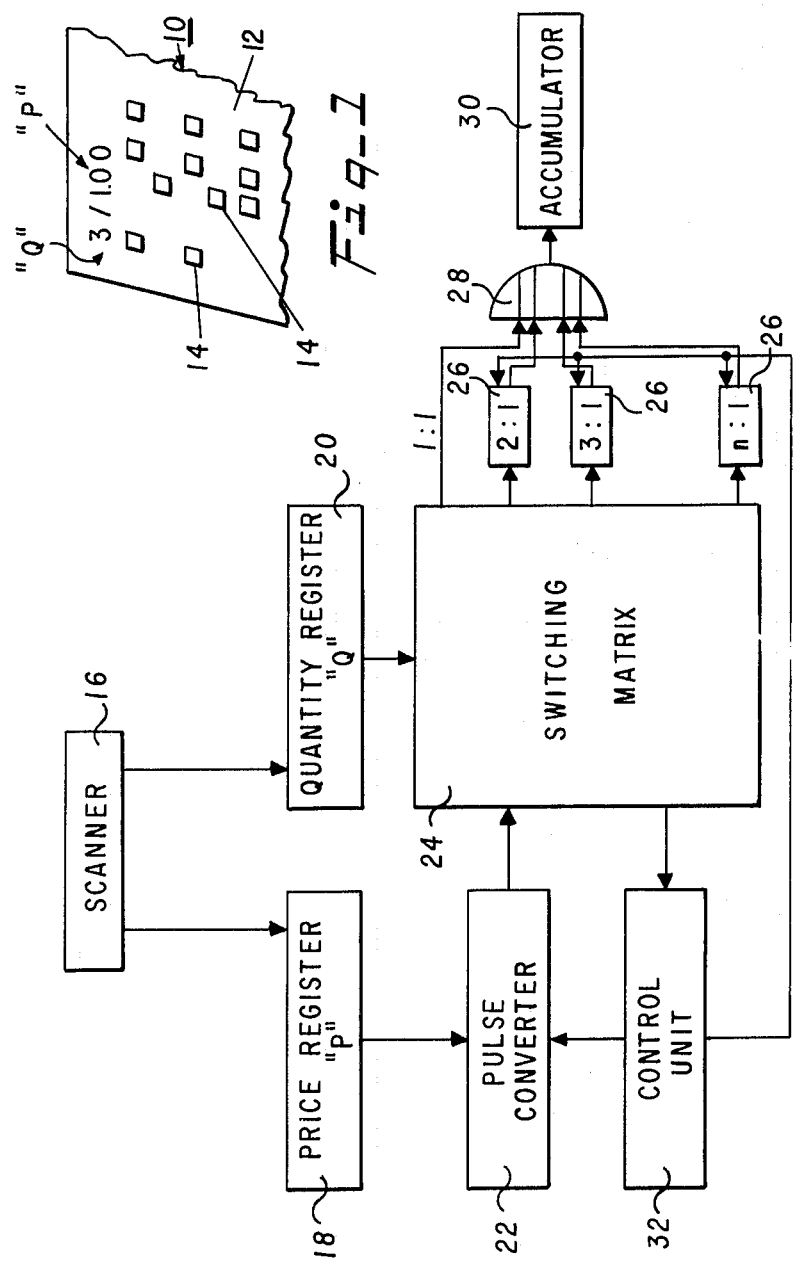
INVENTOR.
CHESTER M. STERN
BY F. A. Sullivan
ATTORNEY

United States Patent Office 3,235,713
Patented Feb. 15, 1966

3,235,713
AUTOMATED PRICE COMPUTATION
Chester M. Stern, Sharon, Mass., assignor to Sylvania Electric Products Inc., a corporation of Massachusetts
Filed Apr. 2, 1959, Ser. No. 803,621
4 Claims. (Cl. 235—61.6)

This invention is concerned with sales recording systems, and particularly with automated price totaling in such systems.

One of the problems associated with the automation of sales outlets, e.g. automatic check-out gates in grocery supermarkets is to provide for equitable pricing of individual items, or less than the given number, when a discount is offered to induce the purchase of multiple quantities. For example, three cans of fruit may be offered for a dollar. Thus, each can will be marked by a suitable legend such as 3/1.00.

In an automated system this price information must be scanned, recorded, and computed in such a manner that the customer will be charged 34¢ for one item, 67¢ for two items, and $1.00 for three items. Consequently, if the customer is to be allowed to present items in any order and any quantity to the sales recorder, the recorder must be capable of dividing the total indicated price by the quantity, storing the quotient, and adjusting the final price charged in accordance with the number of items of this particular category purchased by this particular customer. It is possible to cope with the problem using conventional computer techniques involving arithmetic and memory units, but this requires expensive and complicated equipment.

Accordingly, a primary object of the present invention is to achieve equitable pricing in a relatively more economical and less complicated manner. Another object is to provide improved automated sales recording equipment.

These and related objectives are accomplished in one embodiment of the invention by converting the total multiple price to a series of electrical impulses and employing count-down registers, with a specialized pre-loading technique, to perform the requisite division and storage functions required fo requitable price computation.

Briefly, the system includes a price register arranged to receive a digital representation of the price component and a quantity register arranged to receive a similar representation of the quantity component of, for example, the multiple price 3/1.00. In this illustrative example, the contents of the price register are converted to a train of 100 pulses which are conducted through a switching matrix, controlled by the indication 3 in the quantity register, to an appropriate counter which provides one output pulse for every three input pulses. Each of these output pulses represents a one cent input to the accumulator which totals the charge to the customer. Thus, scanning the multiple price 3/1.00 results in 33⅓ one cent inputs for the accumulator and a total charge of 33 or 34 cents to the customer, depending upon the contents of the register when the pulsing starts. By providing an initial resetting of one less than the quantity they are to process (i.e. Q−1) for the individual counters before each customer's order is processed, the system assures, in a manner which will be explained in more detail below, that an equitable price will be charged whether the customer purchases all or only some of the full number of items required for the discount price.

Other objects, features and advantages of the invention and a better comprehension of its operation will be apparent from the following description of the illustrative system represented by the accompanying drawing, wherein:

FIG. 1 is a diagrammatic representation of a label for a multiple price discounted item; and, FIG. 2 is a block diagram of an electronic data processing subsystem for computing an equitable price for the purchase of any number of such items.

In the automated sales recording system which will be described to illustrate the invention, a label similar to that shown in FIG. 1 is placed upon each article offered for sale and the customer is free to select items at random and present them in any order and any quantity to the automated check-out station. At this station the labels are scanned by the input to a data processing system which computes the equitable price to be charged the customer and prints, or otherwise gives indication of, the total charge for the items purchased.

The label 10 shown in FIG. 1 is the subject of copending U.S. patent application S.N. 787,757, filed January 19, 1959, now abandoned. This application may be consulted for a detailed explanation of the structure and characteristics of the label. Briefly, it comprises a fluorescent substrate 12 upon which price information may be printed in Arabic numerals and set forth for machine input in a binary code by selectively providing punched out code areas 14 in the fluorescent field 12. When this label 10 is excited by a light source to which its substrate 12 is sensitive, it fluoresces and provides an input for a scanning system sensitive to the radiated fluorescent energy. It is, of course, to be understood that the system is not limited to operation with this particular label, but that any suitable mark sensing input may be employed.

In a complete sales recording system, the labels 10 are scanned by a suitable optical means such as a Nipkow disc or a flying spot; or, the information content of the scanned label can be transduced by a suitable television-type pickup tube such as a Vidicon. Since the invention under description is not dependent upon any single one of these techniques, but is equally applicable to all of them, specific details of the scanning operation will be omitted for the purpose of brevity.

The multiple price computing system of FIG. 2 includes a scanner 16, a price register 18, a quantity register 20, a pulse converter 22, a switching matrix 24, a number of count-down registers 26 connected through an OR gate 28 to an accumulator 30, and a control unit 32.

As explained previously, the scanner 16 may be optical or electronic. When it scans a label 10, it provides a pulse coded indication of the price (P) listed on the label and of the quantity (Q) of items to which this price applies. The first information (P) is applied to the price register 18 and the second information (Q) is applied to the quantity register 20. These registers are conventional buffer storage devices and are capable of accepting information serially or in parallel through their respective connections to the scanner 16.

The contents of price register 18 produce, in the pulse converter 22, a train of pulses corresponding in number to the "cents" indication of the price. This pulse train is in turn connected through the switching matrix 24 to a particular count-down register 26 in accordance with the quantity setting Q of quantity register 20. The registers 26 may be conventional counter circuits with different individual count down ratios. Thus, their outputs represent a division of the pulse train from the converter 22 by a factor of two, three, etc., depending upon the count down ratio of the counter concerned.

The outputs of the various counters 26, which are connected through OR gate 28 to the accumulator 30, provide a running total of the amount to be charged the customer whose order is being processed, and the overall system is controlled and synchronized by appropriate gating pulses from the control unit 32, which may also serve as a generator for the pulses counted out to the switching matrix 24 in accordance with the price setting P of the price register 18.

To avoid undue burdening of this description with detailed explanation of matters within the ken of those skilled in this art, a block diagram approach has been followed with a functional description of each block and specific identification of the circuitry it represents. The individual engineer is free to select elements or components such as buffer registers, counters, switching matrices, etc. from his own background knowledge or available standard references such as Arithmetic Operations in Digital Computers, R. K. Richards (Van Nostrand Publishing Co.) and Pulse and Digital Circuits, Millman and Taub (McGraw-Hill).

For example, the scanner 16 may scan the information field 10 to produce a serial train of pulses. Those pulses which comprise a binary coding of the decimal cents equivalent of the total price (P) are routed into a conventional buffer storage register 18, and those pulses which comprise a binary coding of the quantity (Q) which must be purchased before the indicated discount is granted are routed into another conventional buffer storage register 20. Thus, the price and quantity information are each made available as a binary number in separate storage registers 18 and 20.

The control unit 32 may include a conventional multivibrator clock generating a train of pulses conducted to the pulse converter 22 which transmits to the switching matrix 24 a number of these pulses equal to the binary numerical setting of the price register 18. A typical circuit for performing this function employs a reversible binary counter of the type described in the Millman and Taub reference referred to above (see page 335). The binary indication of the number of cent units in the price is transferred from the price register 18 to this counter and a pulse is transmitted to the switching matrix 24 for each pulse of the multivibrator clock in control unit 32 that is required to reverse count the binary setting of the counter to zero.

The train of pulses conducted into the switching matrix 24 is routed to an appropriate output connection 1:1, 2:1, $n$:1, etc., in accordance with the binary numerical setting of quantity register 20. A suitable circuit for accomplishing this function is described in the Millman and Taub reference previously identified (on page 422).

The 1:1 line from matrix 24 is a direct connection, through OR gate 28, to the accumulator 30. It is connected to the output of pulse converter 22 when the binary number in quantity register 20 indicates that there is no discount for multiple purchases of the item concerned, i.e. the price indicated is for one unit of the item concerned.

The count-down or divider circuits 26 may be comprised of conventional shift registers arranged as ring counters of the type referred to by Richards (op. cit.), page 205 ff., for situations where the quantity (Q) to be counted is relatively small. With this type of apparatus the counter is comprised of a number of stages equal to Q, and an output pulse to the accumulator 30 is derived from the last stage of the counter. Thus, a pulse is advanced through the counter, one stage at a time, by successively arriving pulses until a count of Q is achieved, whereupon an output pulse is delivered to the accumulator and the counter is cleared to zero.

For larger values of Q, where a ring counter would involve an excessive number of stages, for example 10 or more, a binary counter of the type discussed by Millman and Taub (op. cit.) at pages 323 ff., may be employed. In this type of arrangement, the counter is constructed to count to the scale, i.e. radix, of the quantity (Q) desired, whereupon it delivers an output pulse to the accumulator 30 and clears itself to zero. One manner in which binary counters may be modified to any radix is shown on page 330 of Millman and Taub wherein feedback control reduces a four stage scale-of-sixteen counter to a scale of ten.

The initial setting of Q minus one for these counters may be accomplished by connecting the System Reset or Start command for processing each customer's order to energize the Q minus one signal indication of each of the counters 26.

The operational procedure followed for each sale is as follows:

(1) Before each customer's order is processed, the individual count-down registers 26 are reset, by appropriate internal wiring, to $Q-1$; i.e., their count down ratio minus one. Thus, the 2:1 register is reset to 1, the 3:1 register is reset to 2, the $n$:1 register is reset to $n-1$, etc.

(2) When the first item of a multiple quantity for which a discounted price is offered is presented to the sales recorder, $Q-1$ (i.e., the initial setting of the count-down register concerned) is added to P (the number of pulses corresponding to the number of cents in the full discounted price; i.e., the contents of price register 18), and then the sum of this addition is divided by Q (the total quantity which must be purchased to merit the discount price), i.e., the contents of quantity register 22. The customer is charged the integer quotient, and the remainder is stored.

(3) When succeeding items in the same category are offered to the sales recorder, the remainder from the previous computation by the particular count-down register concerned is added to the multiple price P and the sum is divided by Q. Again, the customer is charged the integer quotient and the remainder is stored.

This procedure will be more apparent upon analysis of the following examples.

*Example No. 1*

[Multiple price=3/1.00. P (the cents content of the discounted price)=100, Q (the number of these items which must be purchased to merit the full discount)=3, and $Q-1=2$]

| | Division | Charge | Store | Fractional Total | Charge Total |
|---|---|---|---|---|---|
| 1st Item | 102/3=34 | 34¢ | 0 | 33⅓ | $.34 |
| 2nd Item | 100/3=33⅓ | 33¢ | 1 | 66⅔ | .67 |
| 3rd Item | 101/3=33⅔ | 33¢ | 2 | 100 | 1.00 |
| 4th Item | Same as first. | | | | |

*Example No. 2*

[Multiple price=8/93, P=93, Q=8, $Q-1=7$]

| | Division | Charge | Store | Fractional Total | Charge Total |
|---|---|---|---|---|---|
| 1st Item | 100/8=12⅘ | 12¢ | 4 | 11⅝ | $.12 |
| 2nd Item | 97/8=12⅛ | 12¢ | 1 | 23⅜ | .24 |
| 3rd Item | 94/8=11¾ | 11¢ | 6 | 34⅞ | .35 |
| 4th Item | 99/8=12⅜ | 12¢ | 3 | 46⅝ | .47 |
| 5th Item | 96/8=12 | 12¢ | 0 | 58⅝ | .59 |
| 6th Item | 93/8=11⅝ | 11¢ | 5 | 69⅞ | .70 |
| 7th Item | 98/8=12¼ | 12¢ | 2 | 81⅜ | .82 |
| 8th Item | 95/8=11⅞ | 11¢ | 7 | 93 | .93 |
| 9th Item | Same as first. | | | | |

In this manner, an equitable price is charged the customer for each individual item purchased and for his cumulative total of purchases, but he does not get the full benefit of the discount unless he makes the required number of purchases.

The system has been described as operating with a binary coded input. It is equally applicable to other types of coding, and additional accumulators may be provided to furnish sub-totals, etc., as desired. Also, the accumulator 30 may be wired to provide an output in straight binary, binary coded decimal, or other codes, and to operate a variety of visual and printing output mechanisms.

If itemized pricing is desired, the accumulator 30 is read out and reset after each item is processed. If, however, a total price for each customer's sale is all that is required, a running total is allowed to accumulate and this is read out when each complete order has been recorded. Another possibility is to provide two accumulators, one for unit pricing and the other for the running total.

A limitation of the specific embodiment of the invention shown in FIG. 2 is that its processes all multiple priced discount items of the same quantity through the same count-down register 26; i.e., items priced at 3/1.00 are credited in the same counter as those priced at 3/50¢, etc. This results in a breakage in favor of the customer if he should purchase, for example, two items from one category and one from another. This can, however, be avoided by providing a plurality of counters for each Q category and routing price data to be given counters in accordance with its P as well as its Q designations; or, general purpose counters can be used with provision for gating and resetting them for different specific count-downs in accordance with the data being processed.

Although an electronic embodiment of the invention has been described, it can be implemented mechanically. For example, mechanical counters (odometers) specifically designed to count rotation of an input shaft at ratios of 2:1, 3:1, etc. can be substituted for the count-down register 26. In such an arrangement, the Q data exerts its control by clutching the proper odometer to the shaft, the P data may be applied in degrees of shaft rotation, and the read-out data summed on an odometer.

Other modifications and embodiments of the invention will be apparent from the preceding description and comments, and its scope is defined by the following claims.

What is claimed is:

1. For sales recording equipment, a computation system for determining the equitable price to be charged a customer for the purchase of successive individual items from a category of items all priced at a given quantity Q for a given price P including: an accumulator for recording said price to be charged; a plurality of count-down registers connected in OR relationship to said accumulator; different ones of said registers having different count-down ratios corresponding to different Q capabilities of said system; means for resetting each of said registers to a content of Q minus one where Q is a different value for different registers; means for providing a train of electric pulses corresponding to the "cents" content of said P data; sensing means for sensing the Q data; and, means, responsive to said sensing means, for applying said pulse train to a selected one of said count-down registers.

2. A sales recording system for determining the price to be charged for individual items within a category of items all labeled in terms of a given quantity Q for a given total price P, comprising: means for converting said label information into a first electrical impulse indication of said price data P and a second electrical impulse indication of said quantity data Q; a first buffer register for said P data; means for applying said P data to said first register; a second buffer register for said Q data; means for applying said Q data to said second register; a plurality of count-down registers, different ones of said count-down registers being arranged to provide a single output pulse in response to different given numbers, respectively, of input pulses corresponding to different Q possibilities of said label information; an accumulator arranged to provide a running total of said count-down register output pulses; means for resetting said different count-down registers respectively to different Q—1 initial settings; means for providing a series train of electrical impulses corresponding in number to the P setting of said first register; and, switching means arranged to apply said series of impulses to a selected one of said count-down registers in accordance with the Q setting of said second register.

3. For an automated sales recording system wherein customers are permitted to present to a sales recorder indefinite numbers of items in random order from a plurality of categories determined by the given quantity Q of items which may be purchased for a given price P, a data processing sub-system for determining the equitable price to be charged for each customer transaction, comprising: a transducer arranged to derive from each of said items processed through said system a first signal sequence corresponding to said P data and a second signal sequence corresponding to said Q data; a first buffer register for said P data; a second buffer register for said Q data; means for applying said P and Q signal sequences to their respective buffer registers; a pulse generator; a pulse converter arranged to provide a sequence of pulses from said generator equal in number to the "cents" expression of the P data contents of said first buffer register; a switching matrix; means for applying said number of pulses to said matrix; a plurality of count-down registers corresponding to the number of different categories of items said system is intended to process, each of said registers having a different count-down ratio to one corresponding to the Q of its respective category; means for selectively routing said applied pulses through said switching matrix to a particular one of said count-down registers in accordance with the Q contents of said second buffer register; an accumulator; an OR gate arranged to apply the counted down output signals from said several count-down registers to said accumulator; and, a reset circuit arranged to reset each of said count-down registers to a condition corresponding to its associated Q minus one, before the processing of each complete customer transaction is commenced.

4. A system for computing an equitable price to be charged a customer for the purchase of successive individual items from a category of items all priced at a given quantity Q for a given price P comprising: a price register; a quantity register; a pulse converter connected to said price register; a switching matrix connected to said pulse converter and said quantity register; a plurality of count-down registers, each having a different count-down ratio, connected to said switching matrix; an accumulator connected to said count-down registers; and, a reset circuit connected to said count-down registers.

References Cited by the Examiner

UNITED STATES PATENTS

| | | | |
|---|---|---|---|
| 2,353,002 | 7/1944 | Armbruster | 235—61.8 |
| 2,746,679 | 5/1956 | Stratton et al. | 235—61.6 |

MALCOLM A. MORRISON, *Primary Examiner.*

LEO SMILOW, WALTER W. BURNS, JR., DARYL W. COOK, *Examiners.*